Nov. 10, 1964

T. H. VALDES ETAL  
MOLD FOR FORMING A CERAMIC ARTICLE AND  
METHOD OF MAKING THE MOLD 3,156,751

Filed Dec. 6, 1961

INVENTORS.  
Thomas H. Valdes  
Carlman M. Rinck  
BY

THEIR ATTORNEYS

INVENTORS.
Thomas H. Valdes
Carlman M. Rinck
BY
Webb Mackey & Burdin
THEIR ATTORNEYS Nov. 10, 1964 T. H. VALDES ETAL 3,156,751
MOLD FOR FORMING A CERAMIC ARTICLE AND
METHOD OF MAKING THE MOLD
Filed Dec. 6, 1961 3 Sheets-Sheet 3
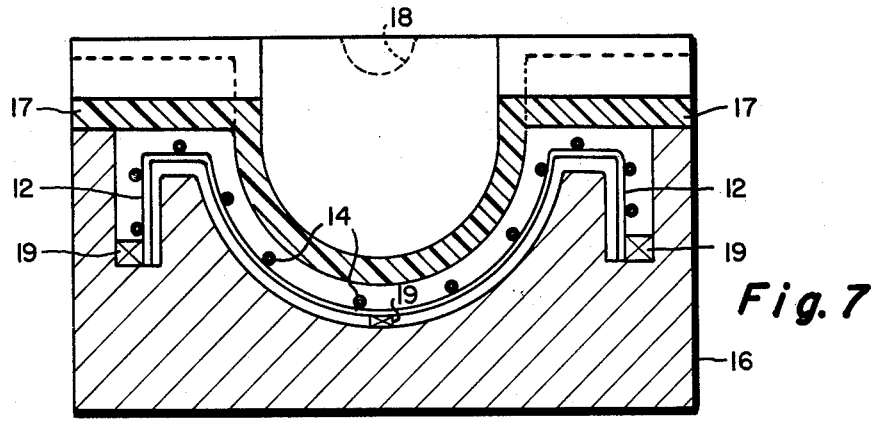
Fig. 7
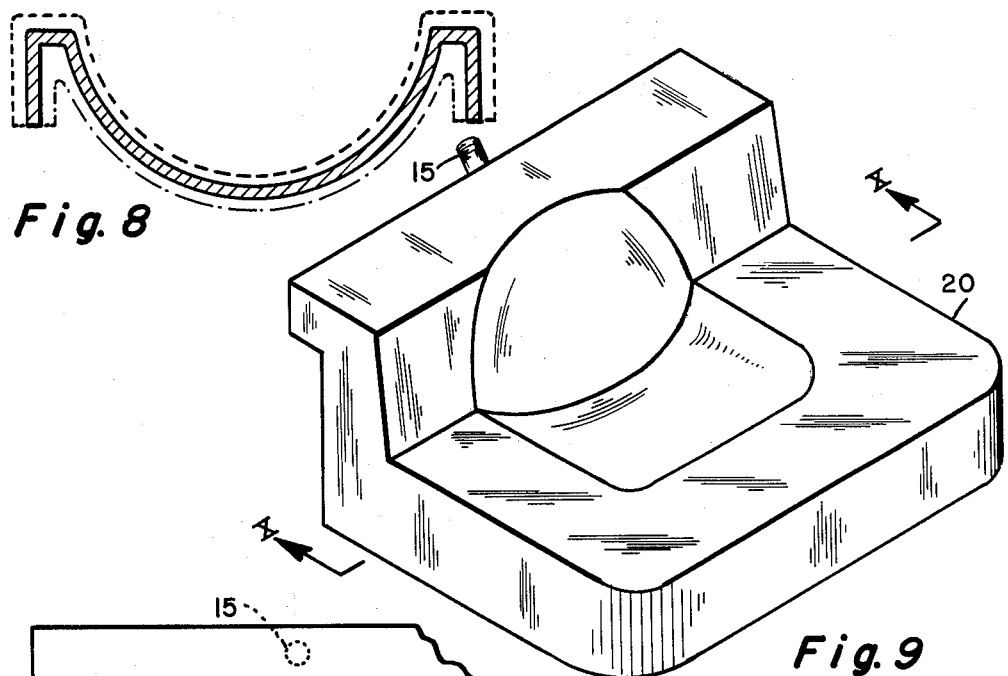
Fig. 8
Fig. 9
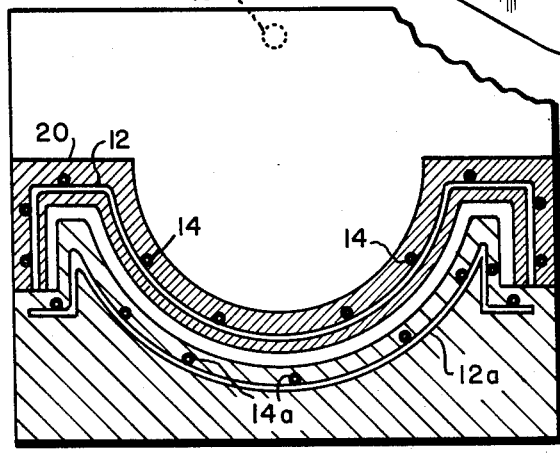
Fig. 10
INVENTORS.
Thomas H. Valdes
Carlman M. Rinck
BY
Webb Mackey + Burden
THEIR ATTORNEYS

United States Patent Office 3,156,751
Patented Nov. 10, 1964

3,156,751
MOLD FOR FORMING A CERAMIC ARTICLE AND METHOD OF MAKING THE MOLD
Thomas H. Valdes, Trenton, and Carlman M. Rinck, Lawrence Township, Mercer County, N.J., assignors to Crane Co., Johnstown, Pa., a corporation of Illinois
Filed Dec. 6, 1961, Ser. No. 157,348
12 Claims. (Cl. 264—219)

This application relates to a mold for forming a ceramic article and method of making the mold. More particularly, it relates to a mold used to form ceramic ware by the slip-casting process.

In the slip-casting process of forming ceramic ware, a water slurry of clay, known as "slip," is poured into a mold made in one or more sections and having a hollow cavity shaped to form the desired green clay piece. The mold sections are made of plaster of Paris which absorbs water from the slip poured into the mold cavity. After the mold has absorbed a sufficient amount of water that the green piece has sufficient strength that it can be handled for further processing such as drying, the mold is opened and the green clay piece removed from the mold.

Although this slip-casting process has been used for many years, it has many drawbacks, particularly with reference to the molds used in the process. In addition to forming the piece, the mold in the slip-casting process withdraws water from the clay; therefore, the mold must be dried before it can be used again. This means that, in order to obtain a good rate of production for each slip line, it is necessary to have a large number of molds in various stages of drying and use. The large number of molds, in turn, reduces the production per unit of floor area.

The drying rate can be increased by artificial drying, but the heat required for the artificial drying adds to the cost of manufacture. On the other hand, if the molds are dried at ambient temperatures, the rate of drying is dependent upon the humidity conditions in the atmosphere.

Moreover, since conventional slip-casting molds are dried by evaporation of the water from the pores of the mold, any minerals carried in the water which made up the slip are deposited in the pores of the mold so that eventually the pores are clogged and the mold can no longer absorb water from the slip and must be discarded.

Our invention overcomes these difficulties. We have invented a new mold which is the same as the conventional plaster mold heretofore used in slip-casting except that, inside the mold, there is a network of porous conduits which parallels the ware forming surfaces of the mold but is spaced inwardly therefrom. The mold carries a fitting whereby the conduits within the mold can be connected to a source of compressed air. After the mold is opened and after the green piece has been removed from the mold, compressed air is blown into the porous conduits and this compressed air drives water absorbed by the mold from the slip out onto the outer surface of the mold from which the water drains. The drying time of the mold is thereby greatly decreased.

It has heretofore been proposed to purge molds of water by embedding air conduits within the mold and by blowing air through the conduits after the ware has been removed from the mold. However, this purging technique has been used only in connection with a pressing process for forming ceramic ware in which a bat of clay is placed between two halves of a mold and the two mold halves are brought together under heavy pressure to form the ware and drive water out of the bat. In this pressing process, the compressed air is forced through the conduits embedded in the mold and out through the ware forming surfaces of the mold primarily to free the ware from the mold which would otherwise be difficult to remove from the mold due to the high pressures involved in forming the ware. The air has then been used incidentally to purge the mold of excess water.

The molds used in a press-forming operation are subjected to high pressures and, therefore, they are carefully made and specially reinforced. After they have become worn beyond the point of usefulness, the molds are broken up and the reinforcement is recovered for reuse in order to keep the cost of the molds as low as possible.

Molds used in slip-casting on the other hand are not subjected to pressure and, therefore, they may be made at relatively low cost as compared to the cost of molds used in press forming. We have invented a process of making molds for slip-casting which, although having embedded air conduits, can be made at a cost only slightly higher than the cost of making conventional slip-casting molds. The process involves the installation of an inexpensive conduit in an inexpensive manner so that, when the mold is discarded after use, the conduit does not have to be recovered.

In the accompanying drawings, we have illustrated certain presently preferred embodiments of our inventions, in which:

FIGURE 7 is a section through the assembly of the bottom half and top half of the case and of the grid prior to pouring the upper part of a mold for forming the green piece shown in FIGURE 1, the section in FIGURE 7 corresponding to the section VIII—VIII in FIGURE 1;

FIGURE 8 is a section along the lines VIII—VIII of FIGURE 1 to which has been added dotted lines and chain lines to show the relative dimensions of the mock-up of FIGURE 2 and of the green piece of FIGURE 1;

FIGURE 9 is an isometric view of the top side of the upper part of a mold used for forming the green piece shown in FIGURE 1; and FIGURE 10 is a section showing the assembly of a complete mold made in accordance with our invention for the pouring of the green piece shown in FIGURE 1, the section being taken along the lines corresponding to the lines X—X of FIGURE 9.

Figure 1:
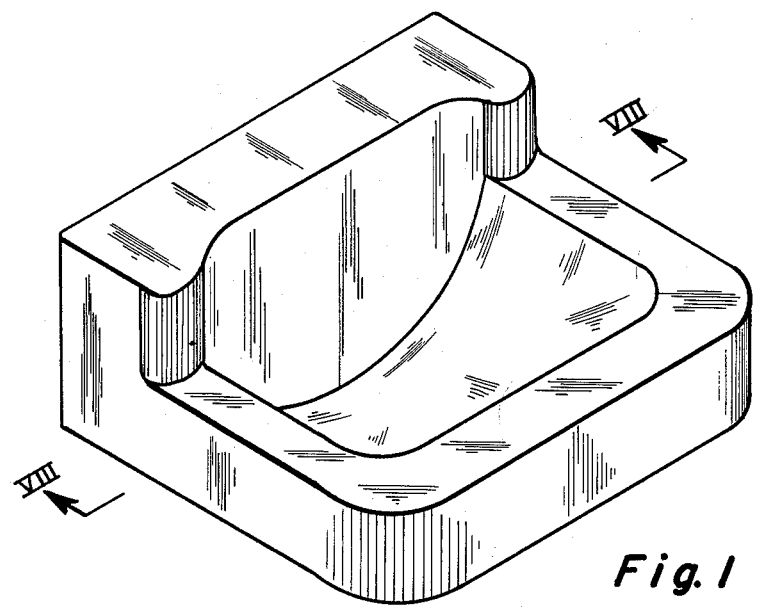
FIGURE 1 is an isometric view of a green ware piece which can be manufactured by the slip-casting process.

Referring to the drawings, FIGURE 1 shows a green clay piece which can be formed by slip-casting in molds made in accordance with our inventions. The green piece shown here is a lavatory, but any ceramic piece made by slip-casting or drain-casting can be made with our inventions.

To make molds for slip-casting a green clay piece such as is shown in FIGURE 1, we first make a mock-up 11 in plaster of the desired finished green piece. The dimensions of this mock-up, however, differ slightly from the dimensions of the finished green piece, as will be explained below.

Figure 2:
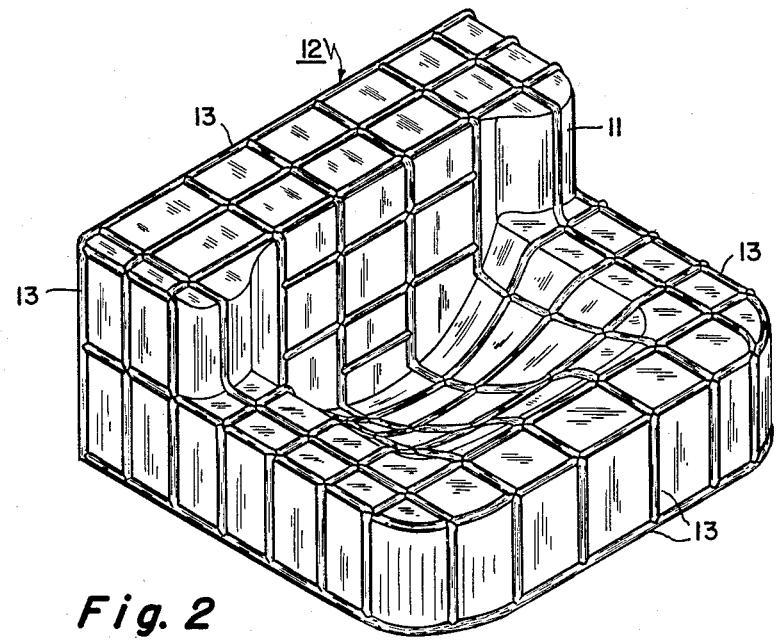
FIGURE 2 is an isometric view of a mock-up of the green piece shown in FIGURE 1 to which has been added a grid of plastic cross members.

A grid 12 is next formed over all of the surfaces of the mock-up 11. FIGURE 2 shows the grid 12 applied to the surfaces of the mock-up 11 corresponding to those surfaces of the green piece of FIGURE 1 which will be formed by the upper part of a complete mold. As shown in FIGURE 2, the grid comprises a plurality of cross members 13 which are spaced from each other and which extend from one side of the mock-up across the surface of the mock-up to the opposite side and from front to back of the mock-up and thus form a network which covers the surface of the mock-up.

The cross members 13 of the grid are made by extruding across the surface of the mock-up 11 ribbons of a plastic material which has a consistency such that it can be extruded, but which hardens to form a rigid grid which can be removed from the mock-up. Preferably, lines are marked on the mock-up 11 which are followed when the plastic ribbons are extruded on its surface so as to obtain uniform grids.

The plastic material used to make the grid is preferably a thermosetting plastic which has a consistency such that it can be extruded in ribbons onto the mock-up by a caulking gun, but which has sufficient consistency that it will not flatten out on the mock-up after it has been extruded. The plastic also should be such that it will set into a relatively rigid grid. We have found that epoxy resins are suitable for making the grid. Epoxy resins are complex polymeric reaction products of polyhydric phenols with polyfunctional halohydrins. The term epoxy or epoxide denotes a compound characterized by the presence of at least one cyclic group, namely, one wherein an ether oxygen group is attached to two adjacent carbon atoms, thereby forming a cyclic structure. A material which we have found to be particularly suitable for making the grid is a material known as "Sonite EA-1 Grout" which is sold by the Smooth-On Company of Jersey City, New Jersey. This material is an epoxy resin, i.e., one of the higher homologs of diglycidyl ether of bisphenol A, to which is added a polyamide curing agent and calcium aluminate filler. The epoxy and the polyamide curing agent are mixed together immediately before using in proportions which vary according to ambient temperatures. We have found that a mixture of 375 parts by weight of curing agent to 500 parts by weight of epoxy is most suitable for average temperature conditions. The consistency of the epoxy resin is regulated by the addition of pure sublimated silica. After extrusion onto the mold, the epoxy cures to form a rigid structure.

Figure 3:
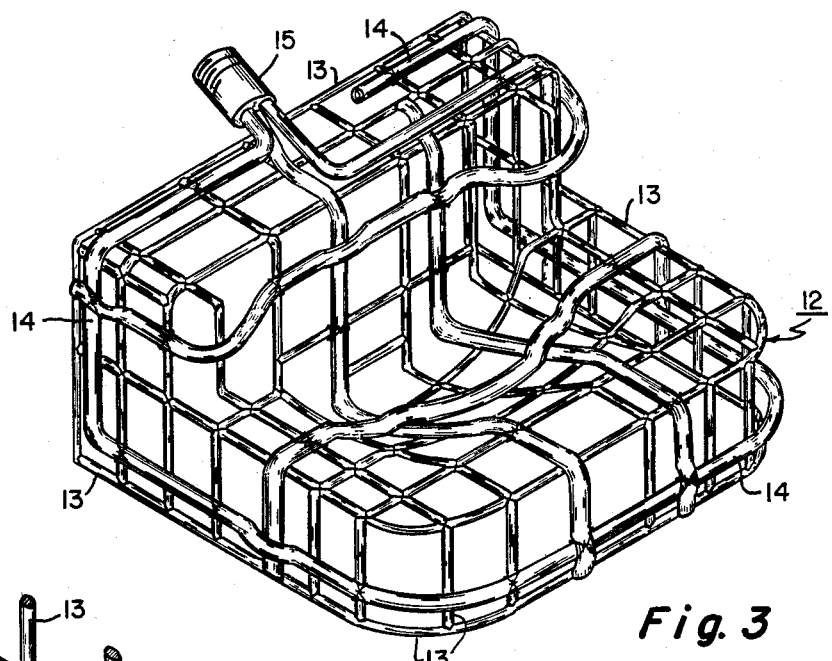
FIGURE 3 is an isometric view of a grid of plastic material to which porous tubing has been tied.
Figure 4:
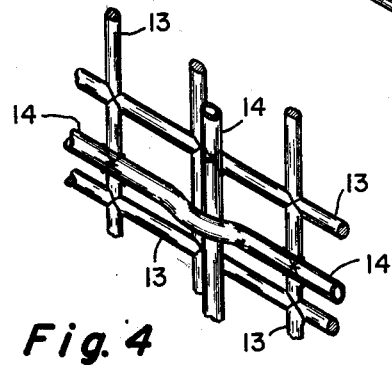
FIGURE 4 is a partial isometric view on an enlarged scale showing a portion of the grid with porous conduit attached.
Figure 6:
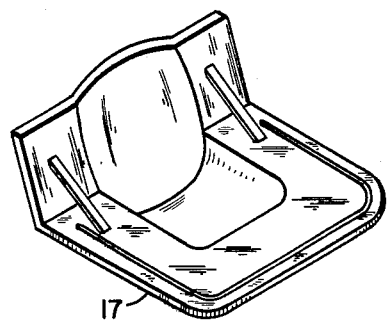
FIGURE 6 is an isometric view of the top of the case which is placed on top of the lower half shown in FIGURE 4 to form a complete case for pouring the upper half of a mold.

After the epoxy resin grid has set, it is removed from the mock-up 11 and lengths of porous conduit 14 are tied to the grid, as shown in FIGURE 3 and (on an enlarged scale) in FIGURE 4. The porous conduit is preferably a woven cotton tubing manufactured by the Pacific Conduit and Cable Corporation of Glendale, California, under the trademark "Molduct," although other materials can be used for the porous conduit such as fiber, woven fiber conduit, or plastic porous conduit.

As shown in FIGURE 3, lengths of conduct are laid across the grid spaced from each other and extending from one side to the other side of the grid and from the front to the back of the grid so as to form a network of conduit which, as will be later explained, will be embedded in the mold part and will extend generally parallel to the ware forming surfaces of the mold but spaced within the mold from those surfaces. Some of the lengths of conduit are extended to a common point spaced from the grid and the ends of the extended lengths are fitted into a pipe nipple 15 to connect the network of conduit to a source of compressed air.

We have found that, when the network of porous conduit is embedded in the mold and when a compressed air line is connected to the pipe nipple 15, air will flow through all of the lengths of conduit forming the network, including those lengths of conduit which do not have ends extending into the pipe nipple. Air will flow from one conduit into another conduit through the porous walls of the conduits at points where the conduits cross. It is not necessary to make any form of joint between lengths of conduit.

Figure 5:
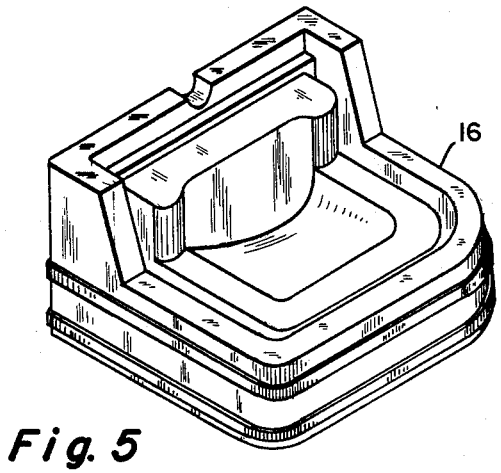
FIGURE 5 is an isometric view of the lower half of a case used for making the upper half of a mold which, in turn, will be used for making the green clay piece shown in FIGURE 1.

The grid with the porous conduit tied to it is then placed in a case 16 into which plaster is poured to form the mold part. FIGURE 5 shows the bottom half of a case for forming a mold part which, in turn, could be used for forming the top surface of the green piece shown in FIGURE 1. Thus, the bottom of the case 16 has a configuration identical to the top of the green piece shown in FIGURE 1. The grid 12 with the network of porous tubing 14 tied to it is placed in the case 16 and a top 17 of epoxy Fiberglas is placed on the case to close it except for the rear top portion of the case through which plaster is poured to form the mold part. As appears in FIGURE 5, a notch 18 is formed in the back wall of the case and the pipe nipple 15 is placed in this notch and the space between the notch and nipple is filled with clay.

FIGURE 7 shows the final arrangement of the lower part of the case 16, the top 17 and grid 12 before the plaster is poured into the case to form the mold part. From FIGURE 7, it will be seen that the network of porous conduit 14, which is secured to the grid, parallels the surface of the case which forms the mold part, but is spaced inwardly from this surface so that, when compressed air is supplied to the conduit through the pipe nipple 15, air will flow through the conduit and out through the pores of the mold to the ware forming surfaces of the mold part. Preferably, the conduits 14 are positioned in the case so that they will be approximately ½" beneath the ware forming surfaces of the mold part.

In order to thus position the porous conduits, it is necessary that the mock-up 11 of the finished green piece on which the plastic grid is formed as described above have dimensions differing from the actual dimensions of the finished green piece. This is illustrated in FIGURE 8 which is a section along the lines VIII—VIII of FIGURE 1. In this figure, the full lines show the actual finished piece and the dotted line shows the dimensions of a mock-up 11 on which the grid will be made for the upper half of the mold used for forming the top surface of the lavatory shown in FIGURE 1. The chain line in FIGURE 8 shows the dimensions of a mock-up on which the grid will be made for the mold part for forming the bottom surface of the lavatory shown in FIGURE 1. As shown in FIGURE 8, the two mock-ups for forming the grids for the top and bottom mold sections have interior dimensions less than the dimensions of the finished piece and exterior dimensions greater than the dimensions of the finished piece. Preferably, the dimensions of the mock-ups differ from the dimensions of the finished piece by approximately one-half inch.

It is also necessary to hold the grid in proper position in the case. This may be done by inserting small pieces of clay 19 in the case between the grid and the bottom and walls of the case. These blocks support the grid at the bottom and keep the grid from moving in the case. After the mold has hardened and been removed from the case, the clay pieces are dug out of the surface of the mold and replaced with plaster of Paris. Alternatively, the spacing blocks can be made of stiff plaster of Paris which, after casting with the main body of the mold, become part of the mold.

FIGURE 9, an isometric view of a finished mold, shows the top side of the upper half 20 of a mold for making the lavatory shown in FIGURE 1, the bottom side of the mold half 20 having the configuration necessary to form the top surface of the lavatory.

FIGURE 10 is a section of an assembled mold for pouring the lavatory of FIGURE 1. The assembly includes the upper half 20 of the mold having embedded therein the grid 12 with the network of porous air conduits 14 and with the pipe nipple 15 extending through the back of the upper half of the mold. The assembly also includes a lower mold part 21 having a grid 12a and conduits 14a. The lower half 21 of the mold is made in the same manner as the upper half 20, as has just been described.

Clay slip is poured into the space between the mold halves 20 and 21 to form the lavatory of FIGURE 1. After the mold has absorbed sufficient moisture from the clay so that it can be handled as a separate piece for subsequent processing, the mold halves are separated and the green piece is removed. Thereupon, a compressed air hose is connected to the pipe nipple 15 and air is blown into the porous conduits 14 and 14a and it flows out through the pores of the mold halves to the ware forming surfaces of the mold parts. This drives out of the mold halves water which they have absorbed from the clay. We have found that air pressure such as is generally available in a casting shop—say air pressure in the order of 50 to 100 pounds—is sufficient to drive the water out of the mold.

Molds made in accordance with our inventions have many advantages over conventional molds used for slip-casting. Our molds can be used three or four times in an 8-hour shift, whereas prior molds can be used only one time in an 8-hour shift without artificial drying. This greatly increases the production per unit of floor area. Moreover, our inventions greatly increase the life of a mold because purging the molds by blowing compressed air through them drives out water which would otherwise evaporate from the pores and leave a residue in the pores which tends to clog the pores. Blowing air through the molds also retards internal organic growth and prevents the pores from being clogged by fungus growth which might otherwise cause soggy spots in the mold and non-uniformity of cast.

The rate of drying of our molds is not dependent upon ambient conditions of temperature and humidity. Therefore, casting shops can be operated at a lower room temperature and weather conditions do not affect the casting or draining time. The number of green ware rejects due to wet molds during rainy weather is decreased, and the caster can more accurately gauge the condition of the mold which he is using.

Our mold can be used in a slip-casting line along with conventional molds so that it is possible to change over from the conventional mold to our mold without any change in the production or composition of the slip and without any change in casting technique. Likewise, no changes are required in the actual process of forming molds beyond the insertion of a grid with porous conduits into the case. No changes need be made in the case.

While we have described certain presently preferred embodiments of our invention, it is to be understood that they may be otherwise embodied within the scope of the appended claims.

We claim:
1. A method of making a mold part for forming a green clay piece which comprises:
 (a) forming surfaces corresponding to the surfaces of the green clay piece which are to be formed by said mold part,
  (1) said surfaces having interior dimensions slightly less and exterior dimensions slightly greater than the green clay piece,
 (b) forming a grid over said surfaces,
 (c) removing the grid from said surfaces,
 (d) securing a network of porous air conduits to said grid,
 (e) leading an end of each of at least some of said conduits to a common point spaced from but adjacent said grid,
 (f) applying to said ends at said common point coupling means whereby compressed air can be supplied to the conduits through said ends,
 (g) positioning the grid and conduits in a mold case with the network of conduits spaced from the surfaces of the mold case which correspond to the surfaces of the green piece to be formed by the mold part,
 (h) closing the mold case, and
 (i) pouring molding material which hardens after pouring and which is water absorbent when hard into the case and around the grid and conduits.

2. A method of making a mold part for forming a green clay piece which comprises:
 (a) forming a mock-up of the green clay piece,
  (1) said mock-up having interior dimensions slightly less and exterior dimensions slightly greater than the green clay piece,
 (b) forming a grid over the surfaces of the mock-up corresponding to the surfaces of the green clay piece which will be formed by the mold part,
 (c) removing the grid from the mockup,
 (d) securing a network of porous air conduits to said grid,
 (e) leading an end of each of at least some of said conduits to a common point spaced from but adjacent said grid,
 (f) applying to said ends at said common point coupling means whereby compressed air can be supplied to the conduits through said ends,
 (g) positioning the grid and network of conduits in a mold case with the conduits extending generally parallel to but spaced from those surfaces of the mold case which correspond to the surfaces of the green piece to be formed by the mold part,
 (h) closing the mold case, and
 (i) pouring molding material which hardens after pouring and which is water absorbent when hard into the case and around the grid and conduits.

3. A method of making a mold part as described in claim 1 in which the mock-up referred to in step (a) has interior dimensions approximately one-half inch less and exterior dimensions approximately one-half inch greater than the corresponding dimensions of the green clay piece.

4. A method of making a mold part as described in claim 1 in which the grid is made of extrudable plastic which sets in situ.

5. A method of making a mold part as described in claim 2 in which ribbons of epoxy resin are placed across the mock-up to form a grid.

6. A method of making a mold part as described in claim 2 in which ribbons of epoxy resin are formed by extrusion when in the plastic state, and in which said ribbons are placed across the mock-up to form the members of the grid.

7. A mold part to be joined with other mold parts to form a cavity into which slip is poured to form a green clay piece which comprises:
 (a) a mold body having surfaces corresponding to a portion of the surfaces of the green clay piece,
 (b) a grid within said mold,
  (1) said grid having cross members arranged to form a network,
  (2) said network extending parallel to but spaced within said body from said mold surfaces,
 (c) a network of porous conduits secured to said grid and positioned within said mold body generally parallel to but away from said mold surfaces,
  (1) the ends of some of said conduits extending to a common point positioned away from said mold body, and
 (d) means for connecting the conduits through said ends positioned at said common point to a source of compressed air.

8. A mold part as described in claim 7 in which the grid is formed of plastic material.

9. A mold part as described in claim 7 in which the grid is formed of a thermosetting plastic material.

10. A mold part as described in claim 7 in which the grid is made of an epoxy resin.

11. A mold part as described in claim 7 in which the means for connecting the ends of the conduits to a source of compressed air comprises a pipe nipple into which the ends are inserted.

12. A mold part as described in claim 7 in which the porous conduits are woven cotton tubing.

References Cited in the file of this patent

UNITED STATES PATENTS

| | | |
|---|---|---|
| 2,584,110 | Blackburn et al. | Feb. 5, 1952 |
| 2,615,229 | Blackburn | Oct. 28, 1952 |
| 2,669,762 | Blackburn | Feb. 23, 1954 |